US011682900B2

(12) United States Patent
Venugopal et al.

(10) Patent No.: US 11,682,900 B2
(45) Date of Patent: Jun. 20, 2023

(54) CURRENT SHARING POWER STAGE FOR PHASE MULTIPLICATION APPLICATIONS

(71) Applicant: TEXAS INSTRUMENTS INCORPORATED, Dallas, TX (US)

(72) Inventors: Rajesh Venugopal, Nashua, NH (US); Matthew John Ascher Schurmann, Manchester, NH (US); Preetam Charan Anand Tadeparthy, Bangalore (IN); Rengang Chen, Center Valley, PA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/339,576

(22) Filed: Jun. 4, 2021

(65) Prior Publication Data
US 2022/0393464 A1 Dec. 8, 2022

(51) Int. Cl.
*H02J 1/10* (2006.01)
*G06F 1/3203* (2019.01)
*H02M 3/158* (2006.01)

(52) U.S. Cl.
CPC .......... *H02J 1/106* (2020.01); *G06F 1/3203* (2013.01); *H02M 3/158* (2013.01)

(58) Field of Classification Search
CPC ....... H02J 1/106; G06F 1/3203; H02M 3/158; H02M 3/1584; H02M 3/1586
See application file for complete search history.

(56) References Cited

U.S. PATENT DOCUMENTS

| | | | |
|---|---|---|---|
| 2004/0169499 A1* | 9/2004 | Huang | H02M 3/1584 323/272 |
| 2005/0088156 A1 | 4/2005 | Cheung et al. | |
| 2007/0296387 A1* | 12/2007 | Dong | H02M 3/157 323/285 |
| 2010/0079175 A1 | 4/2010 | Qiu et al. | |
| 2011/0204947 A1 | 8/2011 | Qiu et al. | |
| 2021/0328510 A1* | 10/2021 | Tang | H02M 3/1584 |

OTHER PUBLICATIONS

Cheung et al., Phase Doubler for High Power Voltage Regulators, 2010, IEEE (Year: 2010).*
PCT Search Report dated Sep. 9, 2022.

\* cited by examiner

*Primary Examiner* — Rexford N Barnie
*Assistant Examiner* — Thai H Tran
(74) *Attorney, Agent, or Firm* — Charles F. Koch; Frank D. Cimino

(57) ABSTRACT

A system includes a first power stage circuit having a first PWM input, a first voltage input and a first power output. The first power stage circuit is configured to provide a first current at the first power output responsive to a PWM signal at the first PWM input, and configured to receive a voltage at the first voltage input. The system includes a second power stage circuit having a second PWM input, a second voltage input and a second power output. The second voltage input is coupled to the first voltage input, and the second power stage circuit is configured to provide a second current at the second power output responsive to the PWM signal at the second PWM input. The second power stage circuit is configured to receive the voltage at the second voltage input, the voltage representing an average of the first current and the second current.

19 Claims, 3 Drawing Sheets

CURRENT SHARING POWER STAGE FOR PHASE MULTIPLICATION APPLICATIONS

BACKGROUND

Power and current requirements for central processing units (CPUs), graphics processing units (GPUs), communications processors, hardware accelerators, and artificial intelligence/machine learning engines have become increasingly demanding. Developing new power controllers to provide increased current can involve a multi-year project. Another method to increase current is to use a modular scheme with an existing power controller, such as phase multiplication. With phase multiplication, a single pulse-width modulation (PWM) signal from the power controller can control multiple power stages.

SUMMARY

In accordance with at least one example of the description, a system includes a first power stage circuit having a first PWM input, a first voltage input and a first power output. The first power stage circuit is configured to provide a first current at the first power output responsive to a PWM signal at the first PWM input, and configured to receive a voltage at the first voltage input. The system includes a second power stage circuit having a second PWM input, a second voltage input and a second power output. The second PWM input is coupled to the first PWM input. The second voltage input is coupled to the first voltage input, and the second power stage circuit is configured to provide a second current at the second power output responsive to the PWM signal at the second PWM input. The second power stage circuit is also configured to receive the voltage at the second voltage input, in which the voltage represents an average of the first current and the second current.

In accordance with at least one example of the description, a system includes a power controller including a PWM output and a power sensing input. The system also includes a first power stage including a first PWM input, a first power output, a first voltage input, and a first current balancing circuit. The first PWM input is coupled to the PWM output of the power controller, and the first power output is coupled to the power sensing input of the power controller. The system also includes a second power stage including a second PWM input, a second power output, a second voltage input, and a second current balancing circuit. The second PWM input is coupled to the PWM output of the power controller. The second power output is coupled to the power sensing input of the power controller, and the second voltage input is coupled to the first voltage input.

In accordance with at least one example of the description, a system includes a power controller. The system also includes a first power stage having a first voltage input and a first current balancing circuit, where the first power stage is configured to receive a PWM signal from the power controller and provide a first current at a first power output. The system also includes a second power stage having a second voltage input and a second current balancing circuit, where the second power stage is configured to receive the PWM signal from the power controller and provide a second current at a second power output. The first power stage is configured to receive a voltage representing an average current of the first current and the second current at the first voltage input. The second power stage is configured to receive the voltage representing the average current of the first current and the second current at the second voltage input. The first current balancing circuit is configured to adjust the first current to match the average current of the first current and the second current. The second current balancing circuit is configured to adjust the second current to match the average current of the first current and the second current.

DETAILED DESCRIPTION

Figure 1:
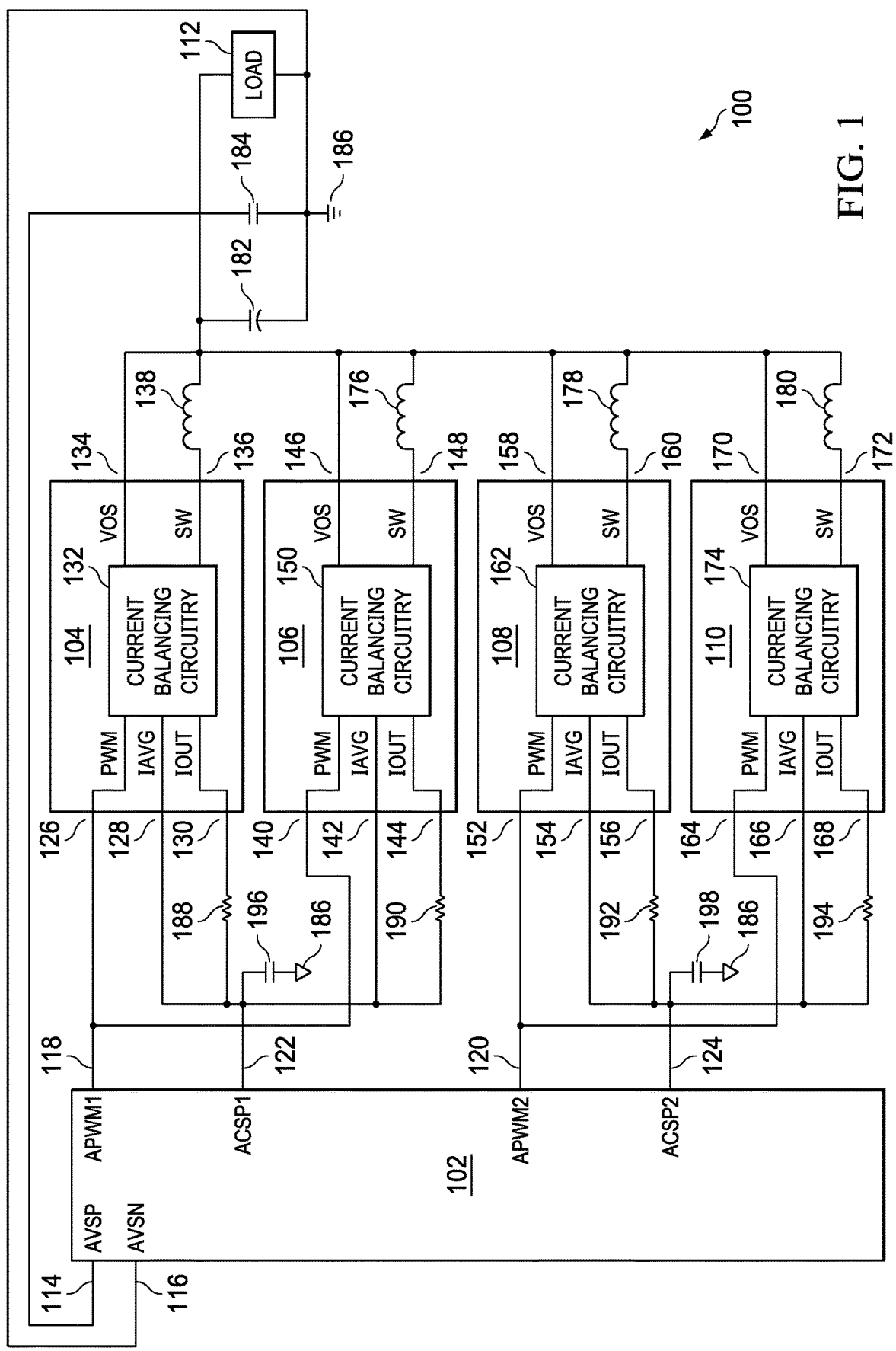
FIG. 1 is a schematic diagram of a system for current balancing power stages in accordance with various examples.

FIG. 1 is a schematic diagram of a system 100 for current balancing power stages according to various examples herein. System 100 includes a power controller 102. Power controller 102 is a step-down controller with dual channels in an example. Power controller 102 controls power stages 104, 106, 108, and 110. In the configuration shown in system 100, power stages 104 and 106 are collectively a first doubled phase pair, and power stages 108 and 110 are collectively a second doubled phase pair. Power stages 104, 106, 108, and 110 drive a load 112. In this example, each power stage 104, 106, 108, and 110 includes current balancing circuitry to balance current between the power stages in each doubled phase pair, as described below.

Power controllers, such as power controller 102, can provide increased current for power stages (e.g., power stage circuits) by using phase multiplication. Phase multiplication involves using a single control signal from the power controller 102 to control multiple power stages (104, 106, 108, and 110) in order to provide a higher current to a load 112. Two or more power stages (104, 106, 108, and 110) may be included within the phase-multiplied group controlled by a single control signal. For example, power stages 104 and 106 are a first group, while power stages 108 and 110 are a second group. To balance the currents between the different phase multiplied groups, the average current of each group is provided to the power controller 102. Power controller 102 balances the currents between the groups based on the average current measurements. However, in conventional systems, the power controller receives feedback regarding the average current of each group. Because a group has two or more power stages, the currents of the individual power stages within a group may not be balanced in conventional systems. The imbalance or mismatch of current within the groups in conventional systems can cause instability in the system, which makes phase multiplication an ineffective solution for providing increased current.

In examples herein, current balancing functions are incorporated inside the individual power stages (104, 106, 108, and 110) rather than solely at the power controller 102. Current balancing circuitry in each power stage (104, 106, 108, and 110) enables each power stage to monitor its own current and the average current in its group. With that information, the power stages can balance current between the power stages within a group. In this example, phase multiplication is performed without adding any additional integrated circuits to the system. With ideal components, the currents between power stages may be balanced almost exactly. However, due to circuit limitations, device imbalances, and process and manufacturing tolerances, currents may be balanced to be within 5% of each other, or within 5% of the average current, in some examples.

Power stages, such as power stages 104, 106, 108, and 110 described in examples herein, have an additional input terminal, which provides each power stage in a group with the average current of the power stages within the group. A control loop balances the currents between power stages within a group based on the average current information. In an example, each power stage can locally adjust its current to match the average current of the power stages in its group. Also, the power controller 102 can balance current between the groups of power stages.

In FIG. 1, power controller 102 includes a number of input and output pins, although only a subset of pins is shown in this example. Power controller 102 includes two channels, A and B, in an example. The examples herein refer to channel A. Power controller 102 includes AVSP pin 114, which is a positive input pin for remote voltage sense for channel A. AVSN pin 116 is a negative input pin for remote voltage sense for channel A. AVSP pin 114 and AVSN pin 116 are coupled to load 112 to receive feedback regarding the load voltage at load 112 and regulate the load voltage.

Power controller 102 also includes APWM1 pin 118 and APWM2 pin 120. APWM1 pin 118 and APWM2 pin 120 are PWM output pins in an example. APWM1 pin 118 provides a PWM signal for a first phase of channel A. The PWM signal from APWM1 pin 118 drives power stages 104 and 106. APWM2 pin 120 provides a PWM signal for a second phase of channel A. The PWM signal from APWM2 pin 120 drives power stages 108 and 110. In some examples, power controller 102 may have 12 or more pins that provide PWM signals to power stages, but two are shown here for simplicity.

Power controller 102 also includes ACSP1 pin 122 and ACSP2 pin 124. ACSP1 pin 122 is a first voltage sensing input pin (e.g., a power sensing input), and ACSP2 pin 124 is a second voltage sensing input pin (e.g., a power sensing input). ACSP1 pin 122 receives a voltage that represents an average output current from power stages 104 and 106. Similarly, ACSP2 pin 124 receives a voltage that represents an average output current from power stages 108 and 110. In operation, power controller 102 balances the currents between the two groups of power stages responsive to the two input voltages received at ACSP1 pin 122 and ACSP2 pin 124. Power controller 102 can adjust the duty cycles of the PWM signals provided by APWM1 pin 118 and APWM2 pin 120 to balance the current between the first pair of power stages (power stages 104 and 106) and the second pair of power stages (power stages 108 and 110).

Power controller 102 can balance the currents between pairs of power stages. However, because power controller 102 receives the average current for each pair of power stages, power controller 102 is unable to balance the current between the power stages within a pair. For example, power controller 102 can balance the currents to ensure the average current of power stages 104 and 106 is approximately equal to the average current of power stages 108 and 110. But this type of current balancing by power controller 102 does not mean that the current of power stages 104 and 106 are balanced. Power controller 102 cannot balance the currents between the power stages within a group for two reasons. First, power controller 102 receives the average current of the group as an input, but does not receive the currents of the individual power stages within the group. Second, power controller 102 drives both power stages with a common PWM that cannot be independently modulated. In examples herein, current balancing circuitry within each power stage (such as power stages 104, 106, 108, and 110) performs current balancing to balance currents between the individual power stages within a group. Therefore, in examples herein, power stages 104 and 106 will have balanced currents, while power stages 108 and 110 will also have balanced currents due to the current balancing circuitry within the power stages.

Power stages 104, 106, 108, and 110 each include a number of input and output pins in some examples, but five pins on each power stage are shown here for simplicity. Power stage 104 includes a PWM input 126 (e.g., a first PWM input). PWM input 126 receives a PWM signal from APWM1 pin 118 of power controller 102. The PWM signal can be a tri-state PWM signal in some examples. The PWM signal from power controller 102 drives power stage 104 to provide the appropriate output power to load 112. Power stage 104 also includes average current (IAVG) input 128 (also referred to as a first voltage input) and current output (IOUT) 130 (also referred to as a first power output). IAVG input 128 receives the average current of the doubled phase pair (or a voltage that represents the average current). IAVG input 128 receives the average current of power stage 104 and power stage 106. Current balancing circuitry 132 within power stage 104 balances the current between power stage 104 and power stage 106 responsive to the average current of the power stages 104 and 106, as described below.

IOUT 130 is an output pin whose voltage represents output current from power stage 104 (e.g., a first power output). A voltage representing output current from power stage 104 is averaged with a voltage representing output current from the other power stages within its group (in this case, power stage 106), and such average voltage (which represents an average of those output currents) is provided to power controller 102 at ACSP1 pin 122. Responsive to that information about the average current, power controller 102 balances the currents between the groups of power stages.

Power stage 104 also includes output voltage sense (VOS) pin 134 and switch node 136. VOS 134 pin is coupled to output inductor 138 and load 112. VOS pin 134 receives feedback regarding the output voltage, which is provided to control loop circuitry of power stage 104. Switch node 136 is the output of power stage 104 and provides power to load 112.

The other power stages (106, 108, and 110) have similar input and output pins as power stage 104 described above. For example, power stage 106 includes PWM input 140 (e.g., a second PWM input), IAVG input 142 (e.g., a second voltage input), IOUT 144 (e.g., a second power output), VOS pin 146, and switch node 148. Power stage 106 also includes current balancing circuitry 150. These components of power stage 106 operate similarly to the equivalent components in power stage 104.

Power stage 108 includes PWM input 152, IAVG input 154 (e.g., a voltage input), IOUT 156 (e.g., a power output), VOS pin 158, and switch node 160. Power stage 108 also includes current balancing circuitry 162. Power stage 110 includes PWM input 164, IAVG input 166 (e.g., a voltage input), IOUT 168 (e.g., a power output), VOS pin 170, and switch node 172. Power stage 110 also includes current balancing circuitry 174.

The switch node for each power stage is coupled to an output inductor. Switch node 148 of power stage 106 is coupled to output inductor 176. Switch node 160 of power stage 108 is coupled to output inductor 178. Switch node 172 of power stage 110 is coupled to output inductor 180. Load 112 is coupled to load capacitors 182 and 184, which are also coupled to ground 186. Load 112 is also coupled to the switch nodes (136, 148, 160, 172) of each power stage (104, 106, 108, 110), which provide power to load 112.

Each power stage (104, 106, 108, 110) senses current flowing through the inductor to which its switch node is connected and replicates sensed current information onto each IOUT pin (130, 144, 156, 168). The replicated signal can either be in the form of an output current or an output voltage. In this example, the replicated signal is a voltage on each IOUT pin. Similar techniques as described herein apply if the power stage replicates a current signal on each IOUT pin.

Each IOUT pin (130, 144, 156, 168) is coupled to a resistor. IOUT 130 in power stage 104 is coupled to resistor 188; IOUT 144 is coupled to resistor 190; IOUT 156 is coupled to resistor 192; and IOUT 168 is coupled to resistor 194. Resistors 188, 190, 192, and 194 are approximately equally sized in one example. Resistors 188 and 190 are coupled to capacitor 196, which is coupled to ground 186. Resistors 192 and 194 are coupled to capacitor 198, which is coupled to ground 186.

In operation, voltages from IOUT 130 of power stage 104 and IOUT 144 of power stage 106 are averaged by resistors 188 and 190, which are components of averaging circuitry. Accordingly, ACSP1 pin 122 of power controller 102 receives an average of the two voltages at IOUT 130 and IOUT 144, which represents an average of the currents from output inductors 138 and 176. Similarly, from averaging circuitry that includes resistors 192 and 194, ACSP2 pin 124 receives an average of the two voltages at IOUT 156 and IOUT 168, which represents an average of the currents from output inductors 178 and 180. Therefore, power controller 102 can balance those two average currents and keep the average current of each group of two power stages in balance. Power controller 102 balances these average currents by adjusting a PWM signal from APWM1 pin 118 or APWM2 pin 120. Increasing the on-time of the PWM signal from APWM1 pin 118 will increase the output currents from power stages 104 and 106. Increasing the on-time of the PWM signal from APWM2 pin 120 will increase the output currents from power stages 108 and 110. Power controller 102 increases or decreases the on-time of either of these two PWM signals to balance the currents between the groups of power stages.

As described above, power controller 102 does not receive information regarding the individual currents from each of the power stages, and therefore cannot balance the current between the power stages in a group, such as power stages 104 and 106. To balance the current between power stages 104 and 106, current balancing circuitry 132 inside power stage 104 and/or current balancing circuitry 150 inside power stage 106 is useful. In an example, power stage 104 receives the average current of power stages 104 and 106 at IAVG input 128. Current balancing circuitry 132 receives the average current from IAVG input 128, the output current from power stage 104, and the PWM signal from APWM1 pin 118. Responsive to those inputs, current balancing circuitry 132 determines whether the output current from power stage 104 differs from the average current of the power stages 104 and 106. If the output current from power stage 104 differs from the average current, current balancing circuitry 132 adjusts the output current from power stage 104 to match that output current with the average current of the power stages 104 and 106. That adjustment balances the output current from power stage 104 with the output current from power stage 106. The output current from power stage 104 can be increased or decreased to balance the output current with the output current from power stage 106. Examples of current balancing circuitry are described below.

In any of the power stages, current balancing circuitry can balance currents as described above with respect to power stage 104. Also, in some examples only one of the power stages in a group of power stages has current balancing circuitry. For example, if power stage 106 has current balancing circuitry but power stage 104 does not, power stage 106 can adjust its output current to balance current with power stage 104. Power stage 104 would not make any adjustments to its output current in this example. Instead, the system would rely on power stage 106 to make appropriate adjustments to keep the currents between the power stages 104 and 106 in balance.

Figure 2:
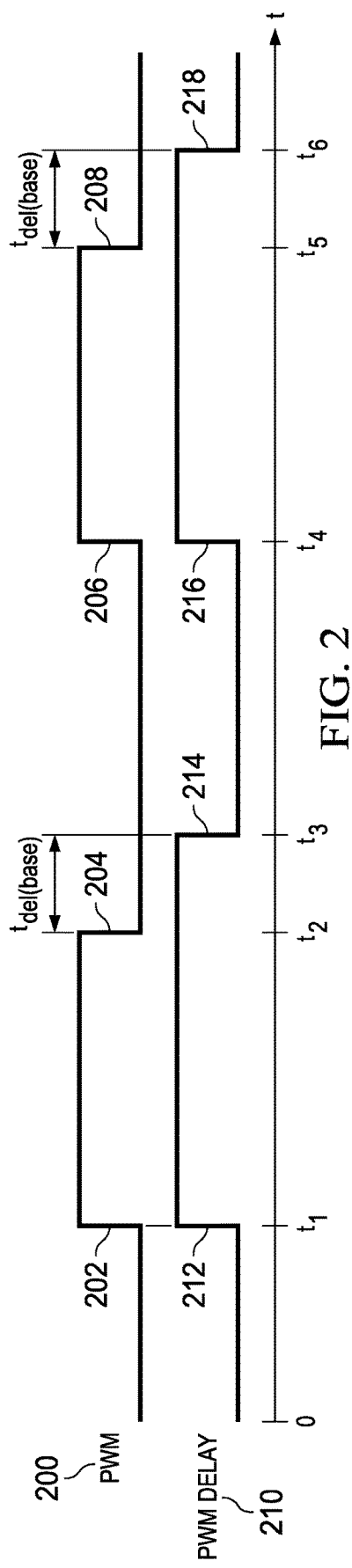
FIG. 2 is a timing diagram including a PWM signal waveform and a PWM_delay signal waveform in accordance with various examples.

FIG. 2 is a timing diagram including a PWM signal waveform and a PWM_delay signal in accordance with various examples. PWM signal 200 is a pulse-width modulated signal output from power controller 102 in system 100, such as the PWM signal from APWM1 pin 118 or APWM2 pin 120. PWM signal 200 has a rising edge 202 at time $t_1$, a falling edge 204 at time $t_2$, a rising edge 206 at time $t_4$, and a falling edge 208 at time $t_5$. PWM signal 200 is operable to drive a power stage to produce output current to a load, as described above with respect to FIG. 1.

System 100 generates a PWM_delay signal 210 to drive power stages and produce output current to a load. PWM_delay signal 210 is produced by delaying the falling edge of the PWM signal 200 by a predetermined amount, called the base delay $t_{del(base)}$. PWM_delay signal 210 is produced using current balancing circuitry (such as current balancing circuitry 132) in a power stage (such as power stage 104) as described below. In an example, PWM_delay signal 210 has a rising edge 212 at time $t_1$. PWM_delay signal 210 has a falling edge 214 at time $t_3$. The falling edge 214 of PWM_delay signal 210 is delayed behind the falling edge 204 of PWM signal 200. This delay is equal to the difference between time $t_3$ and $t_2$. That time difference is the base delay $t_{del(base)}$. PWM_delay signal 210 has another rising edge 216 at time $t_4$, which is at the same time that PWM signal 200 has the rising edge 206. PWM_delay signal 210 has a falling edge 218 at time $t_6$. The falling edge 218 of PWM_delay signal 210 is delayed behind the falling edge 208 of PWM signal 200 by the amount the base delay $t_{del(base)}$ (in this case, $t_6$-$t_5$). Therefore, each falling edge of PWM_delay signal 210 is delayed compared to the falling edges of PWM signal 200. The amount of the delay in each case is the base delay $t_{del(base)}$.

In an example, current balancing circuitry in a power stage adjusts the output current of its respective power stage responsive to the delay of the falling edge (edges 214, 218) of PWM_delay signal 210. Current balancing circuitry in a power stage can increase or decrease the amount of delay between PWM signal 200 and PWM_delay signal 210. Because the times that the rising edges (212, 216) occur remain the same, increasing or decreasing the delay of the falling edges (214, 218) adjusts the on-time of PWM_delay signal 210. Adjusting the on-time of PWM_delay signal 210 can increase or decrease the current provided by the respective power stage. As described below, current balancing circuitry (such as current balancing circuitry 132) adjusts the on-time of PWM_delay signal 210 based on a difference between the power stage's output current and the average current of the power stages in the group. By adjusting the on-time of PWM_delay signal 210, the output current of the respective power stage can be adjusted to match the average current of the power stages in the group and provide current balancing.

Figure 3:
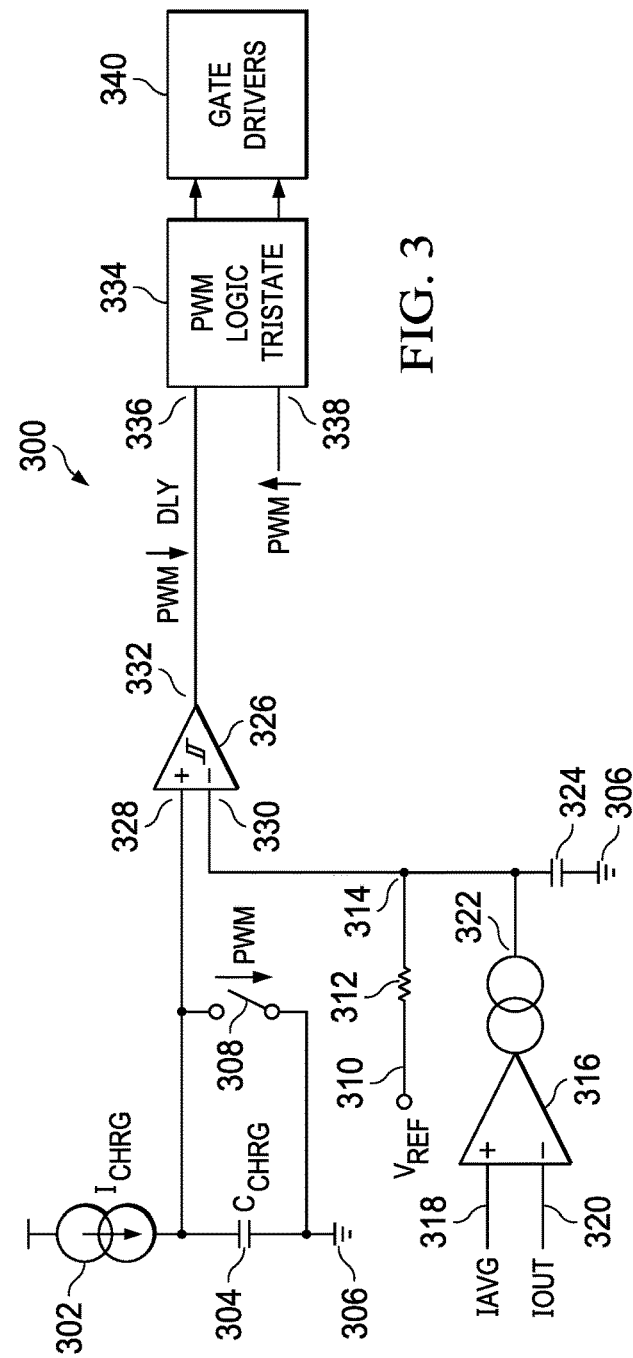
FIG. 3 is a schematic diagram of a current balancing circuit in accordance with various examples.

FIG. 3 is a schematic diagram of a current balancing circuit 300 according to various examples herein. Current balancing circuit 300 can be one of current balancing circuitry 132, 150, 162, or 174 in various examples. In operation, current balancing circuit 300 adjusts a PWM_delay signal, such as PWM_delay signal 210, based on a difference between an output current of a power stage and an average current of the group to which the power stage belongs. Adjusting PWM_delay signal 210 increases or decreases the output current of the power stage to balance the output currents among the group of power stages.

Current balancing circuit 300 includes a current source ICHRG 302 coupled to a first terminal of a capacitor CCHRG 304. A second terminal of capacitor CCHRG 304 is coupled to ground 306. The first terminal of capacitor CCHRG 304 is also coupled to a first terminal of a switch 308. The second terminal of switch 308 is coupled to ground 306. Switch 308 is controlled by the falling edge of PWM signal 200. Switch 308 opens on the falling edge of PWM signal 200.

Current balancing circuit 300 includes a reference voltage terminal 310 that applies a reference voltage $V_{ref}$ to a first terminal of a resistor 312. A second terminal of resistor 312 is coupled to a node 314. Current balancing circuit 300 also includes an error amplifier 316. Error amplifier 316 has a first input 318, a second input 320, and an output 322. First input 318 receives the average current (or a voltage representing the average current) of the group of power stages to which current balancing circuit 300 belongs. For example, if current balancing circuit 300 is located in power stage 104, first input 318 is coupled to IAVG input 128. First input 318 receives the average current of power stage 104 and power stage 106 in this example.

Second input 320 receives the output current (or the output power) of the power stage to which current balancing circuit 300 belongs. For example, if current balancing circuit 300 is located in power stage 104, second input 320 is coupled to IOUT 130. Output 322 of error amplifier 316 is coupled to node 314 and a first terminal of capacitor 324. A second terminal of capacitor 324 is coupled to ground 306. Error amplifier 316 compares the values of the currents (or voltages) at the two inputs (first input 318 and second input 320) and provides an output voltage at output 322 that is proportional to the difference between the two currents (or voltages). Therefore, the output voltage of error amplifier 316 is greater if the difference between the two currents or voltages is greater, and smaller if the difference between the two currents or voltages is smaller. Responsive to the output voltage of error amplifier 316, current balancing circuit 300 adjusts PWM_delay signal 210 to balance the currents of the power stages (such as power stages 104 and 106).

Current balancing circuit 300 also includes a comparator 326. Comparator 326 has a first input 328, a second input 330, and an output 332. In operation, comparator 326 compares a voltage at node 314 with a voltage at the first terminal of capacitor CCHRG 304. Responsive to the voltage at the first terminal of capacitor CCHRG 304 rising above the voltage at node 314, the output of comparator 326 at output 332 goes to a high voltage. The high voltage at output 332 represents the falling edge of PWM_delay signal 210. The falling edge of PWM_delay signal 210 is provided to PWM logic 334 at a first input 336. A rising edge of PWM signal 200 is provided to second input 338 of PWM logic 334. PWM logic 334 controls gate drivers 340 responsive to PWM logic 334 receiving the rising edge of PWM signal 200 at second input 338. Responsive to PWM logic 334 receiving the falling edge of PWM_delay signal 210 at first input 336, PWM logic 334 controls gate drivers 340. Accordingly, for example, responsive to PWM logic 334 receiving the rising edge of PWM signal 200 and the falling edge of PWM_delay signal 210, power stage 104 controls gate drivers 340 to provide a suitable amount of output current to load 112.

In operation, current balancing circuit 300 operates as follows. Switch 308 opens on the falling edge of PWM signal 200. If switch 308 is closed, current from current source ICHRG 302 flows to ground 306. The voltage value at first input 328 is low, and the output of comparator 326 at output 332 is also low. Therefore, PWM logic 334 is not affected by the current balancing circuit when PWM signal 200 is high.

Responsive to switch 308 being opened, a voltage begins to ramp up at the first terminal of capacitor CCHRG 304 and the first input 328 of comparator 326. The time that this voltage takes to ramp up is the source of the delay in the falling edge of the PWM signal 200, which creates the falling edge of the PWM_delay signal 210 at output 332. In other words, a falling edge of PWM signal 200 occurs. However, PWM logic 334 does not detect this falling edge as it occurs. Instead, a voltage ramp occurs at the first terminal of capacitor CCHRG 304. Responsive to this voltage ramp reaching a certain threshold, comparator 326 provides a high voltage that is provided to PWM logic 334, which represents the falling edge of the PWM signal 200. The falling edge is referred to as PWM_delay signal 210 because it is delayed behind PWM signal 200. The time delay for the voltage to reach the threshold creates the base delay $t_{del(base)}$ described above with respect to FIG. 2. Therefore, the voltage at the first input 328 of comparator 326 ramps up after the falling edge of PWM signal 200 occurs. Responsive to the voltage at the first input 328 surpassing the voltage at the second input 330, the output of comparator 326 at output 332 goes to a high voltage.

Responsive to switch 308 being opened, comparator 326 compares the ramped voltage at first input 328 to a reference voltage at node 314. The reference voltage at node 314 can be set by adjusting the value of $V_{ref}$ applied to reference voltage terminal 310 and adjusting the value of resistor 312. The reference voltage at node 314 is set at a voltage level where the ramped voltage at first input 328 will overtake the reference voltage at node 314 at the programmed time. The programmed time determines the length of the delay ($t_{del(base)}$) before the falling edge of the PWM_delay signal 210 occurs at output 332 and is propagated to PWM logic 334.

To increase or decrease an output current of a power stage in order to balance currents between power stages, the length of the delay of the falling edge of PWM_delay signal 210 is adjusted. The length of this delay is adjusted by adjusting the value of the reference voltage at node 314. If the value of the reference voltage at node 314 increases, the length of time that it takes for the ramped voltage at the first input 328 to ramp up high enough to surpass the reference voltage also increases. That additional length of time, in turn, increases the delay before comparator 326 provides a high signal to PWM logic 334. That delay is the delay in the falling edge of PWM_delay signal 210 being propagated to PWM logic 334.

The length of the delay for the falling edge of PWM_delay signal 210 to be propagated to PWM logic 334 is useful for adjusting the output current of the power stage to balance the output current with the other power stages in the group. As described above, one way to adjust the length of this delay is to adjust the value of the reference voltage at node 314. The value of the reference voltage at node 314 can be adjusted in a manner that is representative of the difference in currents (power stage output current IOUT and average current IAVG) by using the output of error amplifier 316 to adjust the reference voltage at node 314. Error amplifier 316 compares the values of the currents at the two inputs (318 and 320) and provides an output voltage at output 322 that is proportional to the difference between the two currents. The output voltage at output 322 is added to the reference voltage at node 314.

In one example, the output current of power stage 104 (IOUT) is coupled to second input 320 of error amplifier 316. In this example, IOUT is below the average (IAVG) of the currents of power stages 104 and 106. Therefore, IOUT should be increased to balance the currents between power stages 104 and 106. The currents IOUT and IAVG are provided to error amplifier 316. Error amplifier 316 produces a voltage output at output 322 that is representative of the size of the difference between the currents IOUT and IAVG. The voltage output at output 322 is added to the reference voltage at node 314 to increase the voltage value at node 314. As the reference voltage at node 314 increases, the length of time before comparator 326 provides a voltage at output 332 that represents the falling edge of PWM_delay signal 210 also increases. Therefore, the falling edge is delayed even longer, due to the increase in the reference voltage at node 314. A delay in the falling edge means that the PWM signal 200 is high for a longer period of time. A PWM signal with a longer on-time increases the current provided at the output of power stage 104. The output current of the power stage (TOUT) will increase accordingly. As described above, IOUT was below IAVG at the beginning of this example. To balance the currents in the group, IOUT should be increased. Current balancing circuit 300 delayed the falling edge of PWM_delay signal 210, based on the difference between IOUT and IAVG. This delay in the falling edge of PWM_delay signal 210 caused an increase in IOUT, which balanced the currents in power stages 104 and 106. Current balancing circuit 300 can continue to operate in this manner to adjust the IOUT current of power stage 104 to balance the currents between the power stages.

In another example, current balancing circuit 300 can decrease the value of the output current from power stage 104. Decreasing the value of the output current is accomplished by lowering the value of the reference voltage at node 314. Lowering the value of the reference voltage at node 314 causes the output of comparator 326 to provide a high voltage more quickly, which reduces the delay in the falling edge of PWM_delay signal 210. Reducing the delay means that the falling edge of PWM_delay signal 210 occurs more quickly, which reduces the on-time of the PWM signal 200. Reducing the on-time reduces the current provided at the output of power stage 104 to bring the currents between power stages 104 and 106 into balance.

In sum, current balancing circuit 300 detects a difference between an output current of a power stage and the average current of the group that the power stage belongs to. Current balancing circuit 300 adjusts a delay of a falling edge of a PWM signal responsive to this difference. By adjusting the delay, the PWM signal can be on for a longer or shorter period of time. Adjusting the on-time of the PWM signal adjusts the output current of the power stage, and this adjustment is useful for increasing or decreasing the size of the output current in order to balance the output currents of the power stages within a phase-multiplied group.

Current balancing circuit 300 provides one solution for current balancing inside a power stage of a power controller system. With this solution, a power controller such as power controller 102 does not have to be modified to provide current balancing within power stages of a group. A power controller can also support higher current applications by using phase multiplication. Other types of current balancing circuits are useful in other examples.

Figure 4:
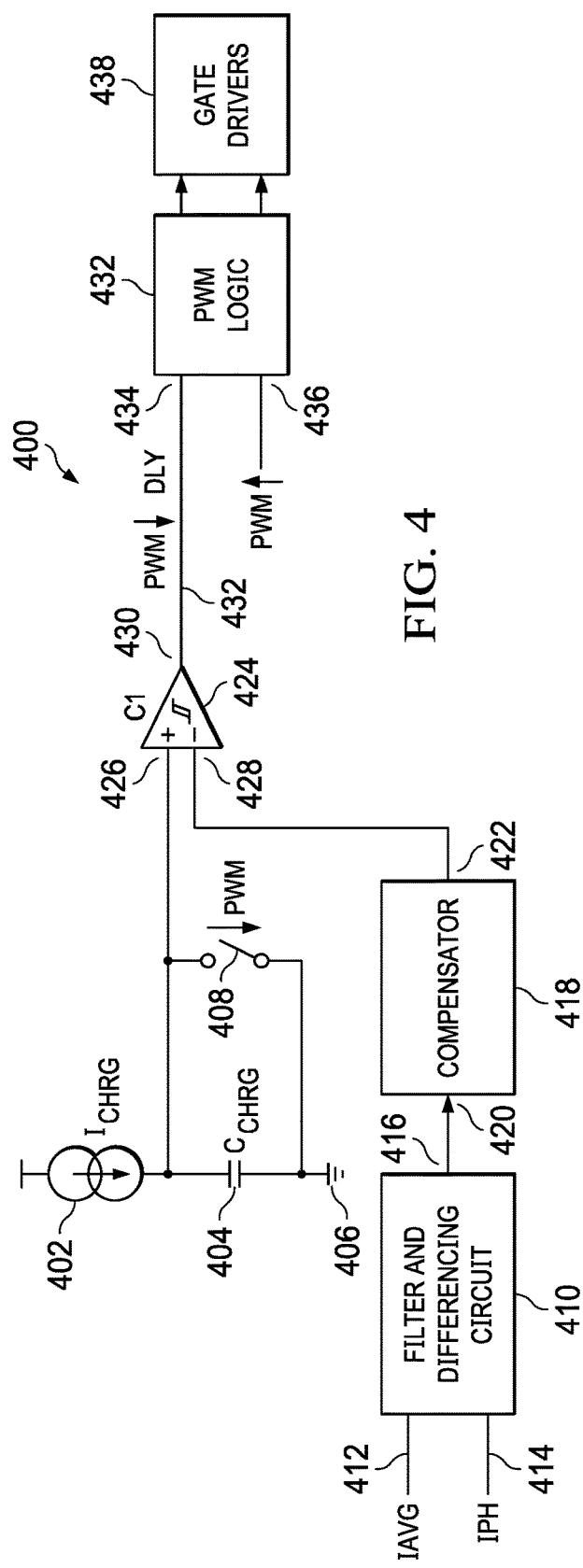
FIG. 4 is a schematic diagram of a current balancing circuit in accordance with various examples.

FIG. 4 is a schematic diagram of a current balancing circuit 400 according to various examples herein. Current balancing circuit 400 can be one of current balancing circuitry 132, 150, 162, or 174 in various examples. Current balancing circuit 400 operates similarly to current balancing circuit 300 described above. Current balancing circuit 400 detects a difference between an output current of a power stage and the average current of the group that the power stage belongs to. Current balancing circuit 400 adjusts a delay of a falling edge of a PWM signal responsive to this difference. By adjusting the delay, the PWM signal can be on for a longer or shorter period of time. Adjusting the on-time of the PWM signal adjusts the output current of the power stage, and this adjustment is useful for increasing or decreasing the size of the output current in order to balance the output currents of the power stages within a phase-multiplied group.

Current balancing circuit 400 includes current source ICHRG 402 coupled to a first terminal of a capacitor CCHRG 404. A second terminal of capacitor CCHRG 404 is coupled to ground 406. The first terminal of capacitor CCHRG 404 is also coupled to a first terminal of a switch 408. The second terminal of switch 408 is coupled to ground 406. Switch 408 is controlled by the falling edge of PWM signal 200. Switch 408 opens on the falling edge of PWM signal 200.

Current balancing circuit 400 includes a filter/differencing circuit 410. Filter/differencing circuit 410 has a first input 412, a second input 414, and an output 416. First input 412 receives the average current of the group of power stages to which current balancing circuit 400 belongs. For example, if current balancing circuit 400 is located in power stage 104, first input 412 is coupled to IAVG input 128. First input 412 receives the average current of power stage 104 and power stage 106 in this example.

Second input 414 receives the output current of the power stage to which current balancing circuit 400 belongs. For example, if current balancing circuit 400 is located in power stage 104, second input 414 is coupled to IOUT 130. Output 416 of filter/differencing circuit 410 provides an output signal to compensator 418 at input 420. Filter/differencing circuit 410 compares the values of the currents at the two inputs (first input 412 and second input 414) and provides an output voltage at output 416 that is proportional to the difference between the two currents. Therefore, the output voltage of filter/differencing circuit 410 is greater if the difference between the two currents is greater, and smaller if the difference between the two currents is smaller. The output voltage of filter/differencing circuit 410 is increased by compensator 418 to an appropriate voltage level and provided at output 422. Output 422 is coupled to comparator 424. Similar to FIG. 3 above, current balancing circuit 400 determines how much to adjust PWM_delay signal 210 in order to balance the currents of the power stages (such as power stages 104 and 106) responsive to the voltage provided at output 422.

Referring again to FIG. 4, current balancing circuit 400 includes a comparator 424. Comparator 424 has a first input 426, a second input 428, and an output 430. In operation, comparator 424 compares a voltage from output 422 with a voltage at the first terminal of capacitor CCHRG 404. Responsive to the voltage at the first terminal of capacitor CCHRG 404 rising above the voltage from output 422, the output of comparator 424 at output 430 goes to a high voltage. The high voltage at output 430 represents the falling edge of PWM_delay signal 210. The falling edge of PWM_delay signal 210 is provided to PWM logic 432 at a first input 434. A rising edge of PWM signal 200 is provided at a second input 436 of PWM logic 432. PWM logic 432 controls gate drivers 438 responsive to PWM logic 432 receiving the rising edge of PWM signal 200 at second input 436. Responsive to PWM logic 432 receiving the falling edge of PWM_delay signal 210 at first input 434, PWM logic 432 controls gate drivers 438. Accordingly, for example, responsive to PWM logic 432 receiving the rising edge of PWM signal 200 and the falling edge of PWM_delay signal 210, power stage 104 controls gate drivers 438 to provide a suitable amount of output current to load 112.

Current balancing circuit 400 operates similarly to current balancing circuit 300, so a detailed example of the operation of current balancing circuit 400 is not repeated herein. Other current balancing circuits are useful in other examples. This description is applicable to any current balancing circuit, within a power stage, that adjusts an output current of the power stage to balance currents between power stages in a phase-multiplied group.

For example, power stages with current balancing circuitry as described herein are useful wherever phase-multiplied power stages produce high output currents to drive a load. A power stage for a field programmable gate array (FPGA) point-of-load (POL) regulator can benefit from the current balancing circuitry described herein, which provides high output current using phase multiplication. The examples described herein are also useful for CPUs, GPUs, communications processors and hardware accelerators that have power stages with high output current.

In various examples herein, a power controller without current balancing capabilities is useful. As described above, power controller 102 receives information about respective currents of the power stages via ACSP1 pin 122 and ACSP2 pin 124. Some power controllers do not have the capability to receive this information and balance the currents of the power stages. Instead, these "dumb" controllers send a command to each power stage to provide a certain number of amps, such as 10 amps. The power stages each attempt to provide 10 amps. However, due to process variations or other mismatches, some of the power stages may not provide the commanded current. The dumb controller is unable to receive feedback regarding the output current of each power stage and adjust the command signals. Instead, examples herein can employ resistors to provide an average of the output currents of the power stages (similar to resistors 188 and 190 in FIG. 1, which provide an average current to power controller 102). This average current is provided to one or more of the power stages via an IAVG input, such as IAVG input 128. The power stages can then balance the currents as described above by increasing or decreasing their respective currents. The power stages can also increase or decrease their respective currents to match the commanded current from the dumb controller. Therefore, if a power controller cannot balance currents, the examples described herein can provide current balancing via the current balancing circuitry in the power stages.

Figure 5:
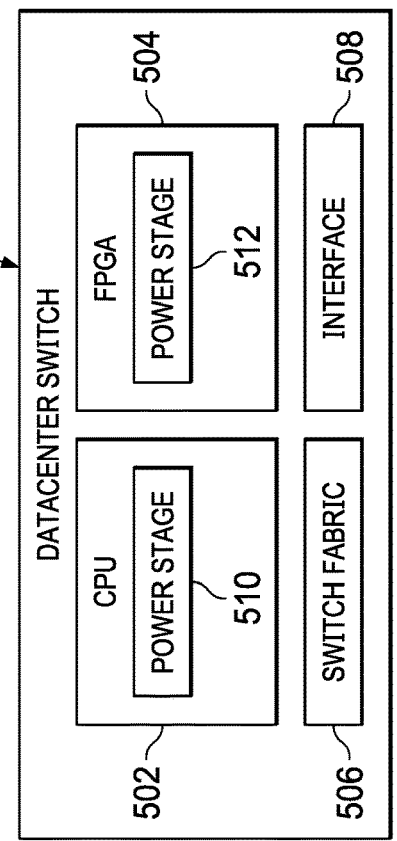
FIG. 5 is a block diagram of a datacenter switch including current balancing power stages in accordance with various examples.

FIG. 5 is a block diagram of a datacenter switch 500 including current balancing power stages in accordance with various examples. Datacenter switch 500 is a simplified diagram with many components of the datacenter switch not illustrated. Datacenter switch 500 includes CPU 502, FPGA 504, switch fabric 506, and interface 508. CPU 502 includes a power stage 510, and FPGA 504 includes a power stage 512. Power stages 510 and 512 are examples of system 100 described above, which includes a power controller and multiple power stages according to examples herein. Power stages 510 and 512 provide current balancing functions and high current output for CPU 502 and FPGA 504, respectively.

In this description, the term "couple" may cover connections, communications or signal paths that enable a functional relationship consistent with this description. For example, if device A provides a signal to control device B to perform an action, then: (a) in a first example, device A is directly coupled to device B; or (b) in a second example, device A is indirectly coupled to device B through intervening component C if intervening component C does not substantially alter the functional relationship between device A and device B, so device B is controlled by device A via the control signal provided by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end-user and/or a third-party.

Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitor, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value.

Modifications are possible in the described examples, and other examples are possible within the scope of the claims.

What is claimed is:

1. A system, comprising:
   a first power stage circuit having a first pulse-width modulated (PWM) input, a first voltage input and a first power output, the first power stage circuit configured to:
      provide a first current at the first power output responsive to a PWM signal at the first PWM input; and
      receive a voltage at the first voltage input; and
   a second power stage circuit having a second PWM input, a second voltage input and a second power output, the second PWM input coupled to the first PWM input, the second voltage input coupled to the first voltage input, and the second power stage circuit configured to:
      provide a second current at the second power output responsive to the PWM signal at the second PWM input; and
      receive the voltage at the second voltage input, in which the voltage represents an average of the first current and the second current;
   wherein:
      the first power stage circuit is configured to determine a first error signal of the first current based on the first current and the average;
      the first power stage circuit is configured to adjust the first current based on the first error signal;
      the second power stage circuit is configured to determine a second error signal of the second current based on the second current and the average;
      the second power stage circuit is configured to adjust the second current based on the second error signal;
      the first error signal is output from a first differencing circuit and increased by a first compensator; and
      the second error signal is output from a second differencing circuit and increased by a second compensator.

2. The system of claim 1, wherein the first PWM input and the second PWM input are adapted to be coupled to a power controller that provides the PWM signal.

3. The system of claim 2, wherein the first and second voltage inputs are adapted to be coupled to a voltage sensing input of the power controller.

4. The system of claim 3, wherein the power controller is configured to adjust the PWM signal based at least in part on the voltage.

5. The system of claim 1, wherein the first power stage circuit includes a current balancing circuit configured to adjust the first current to within five percent (5%) of the average, responsive to the voltage.

6. The system of claim 5, wherein the current balancing circuit includes an error amplifier having an amplifier output and first and second amplifier inputs, the first amplifier input coupled to the first power output, and the second amplifier input coupled to the first voltage input.

7. The system of claim 6, wherein the error amplifier is configured to provide the first error signal at the amplifier output, the first error signal representing a difference between the first current and the average.

8. The system of claim 7, wherein the current balancing circuit is configured to adjust a delay in the PWM signal responsive to the first error signal.

9. The system of claim 5, wherein the second power stage circuit includes a current balancing circuit configured to adjust the second current to within five percent (5%) of the average, responsive to the voltage.

10. The system of claim 1, further comprising averaging circuitry having first and second circuitry inputs and first and second circuitry outputs, the first and second circuitry inputs respectively coupled to the first and second power outputs, and the first and second circuitry outputs respectively coupled to the first and second voltage inputs.

11. A system, comprising:
    a power controller including a pulse-width modulated (PWM) output and a power sensing input;
    a first power stage including a first PWM input, a first power output, a first voltage input, and a first current balancing circuit, the first PWM input coupled to the PWM output of the power controller, and the first power output coupled to the power sensing input of the power controller; and
    a second power stage including a second PWM input, a second power output, a second voltage input, and a second current balancing circuit, the second PWM input coupled to the PWM output of the power controller, the second power output coupled to the power sensing input of the power controller, and the second voltage input coupled to the first voltage input;
    wherein:
      the first current balancing circuit includes a first differencing circuit including a first input coupled to the first voltage input, a second input coupled to the first power output, and an output coupled to a first compensator, the first differencing circuit configured to determine a first error signal, and the first current balancing circuit configured to adjust a first current based on the first error signal; and
      the second current balancing circuit includes a second differencing circuit including a first input coupled to the second voltage input, a second input coupled to the second power output, and an output coupled to a second compensator, the second differencing circuit configured to determine a second error signal, and the second current balancing circuit configured to adjust a second current based on the first error signal.

12. The system of claim 11, wherein the first current balancing circuit is coupled to the PWM input, the first power output, and the first voltage input.

13. The system of claim 12, wherein the first current balancing circuit includes an error amplifier having an amplifier output and first and second amplifier inputs, the first amplifier input coupled to the first power output, and the second amplifier input coupled to the first voltage input.

14. The system of claim 13, wherein the amplifier output is coupled to a first input of a comparator.

15. The system of claim 11, wherein the second current balancing circuit is coupled to the PWM input, the second power output, and the second voltage input.

16. The system of claim 11, wherein the first power stage includes a first output coupled to a load, and the second power stage includes a second output coupled to the load.

17. A system, comprising:
    a power controller;
    a first power stage having a first voltage input and a first current balancing circuit, wherein the first power stage is configured to receive a pulse-width modulated (PWM) signal from the power controller and provide a first current at a first power output; and a second power stage having a second voltage input and a second current balancing circuit, wherein the second power stage is configured to receive the PWM signal from the power controller and provide a second current at a second power output, wherein the first power stage is configured to receive a voltage representing an average current of the first current and the second current at the first voltage input, wherein the second power stage is configured to receive the voltage representing the average current of the first current and the second current at the second voltage input, wherein the first current balancing circuit includes a first differencing circuit to determine a first error signal;

wherein the first current balancing circuit includes a first compensator to increase the first error signal;

wherein the first error signal is configured to adjust the first current to match the average current of the first current and the second current, wherein the second current balancing circuit includes a second differencing circuit to determine a second error signal;

wherein the second current balancing circuit includes a second compensator to increase the second error signal;

wherein the second error signal is configured to adjust the second current to match the average current of the first current and the second current; and wherein the first current balancing circuit is configured to adjust a delay in the PWM signal to adjust the first current based at least in part on a difference from an error amplifier.

18. The system of claim 17, wherein the power controller is configured to adjust the PWM signal based at least in part on the voltage representing the average current of the first current and the second current.

19. The system of claim 17, wherein the first current balancing circuit includes the error amplifier having an amplifier output and first and second amplifier inputs, the first amplifier input coupled to the first power output, and the second amplifier input coupled to the first voltage input.

* * * * *